(12) United States Patent
Watanabe (10) Patent No.: US 8,781,524 B2
(45) Date of Patent: Jul. 15, 2014

(54) WIRELESS COMMUNICATION DEVICE

(71) Applicant: Denso Corporation, Kariya (JP)

(72) Inventor: Yuusuke Watanabe, Anjo (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 13/665,041

(22) Filed: Oct. 31, 2012

(65) Prior Publication Data

US 2013/0109328 A1 May 2, 2013

(30) Foreign Application Priority Data

Nov. 1, 2011 (JP) ................................ 2011-240171

(51) Int. Cl.
*H04W 88/06* (2009.01)
*H04B 1/38* (2006.01)
*H04B 1/40* (2006.01)
*H04B 1/00* (2006.01)

(52) U.S. Cl.
CPC ................ *H04B 1/40* (2013.01); *H04W 88/06* (2013.01); *H04B 1/005* (2013.01)
USPC ........................................ 455/553.1; 455/73

(58) Field of Classification Search
USPC ............................................... 455/553.1, 73
See application file for complete search history.

(56) References Cited

U.S. PATENT DOCUMENTS

| | | | | |
|---|---|---|---|---|
| 6,466,803 B1 * | 10/2002 | Gardner | ..................... | 455/553.1 |
| 6,751,470 B1 * | 6/2004 | Ella et al. | ................... | 455/552.1 |
| 7,313,368 B2 * | 12/2007 | Wu et al. | .......................... | 455/73 |
| 7,400,862 B2 * | 7/2008 | Domino et al. | ................. | 455/78 |
| 8,160,510 B2 * | 4/2012 | Kanou | ............................. | 455/78 |
| 8,391,820 B2 * | 3/2013 | Forrester | ....................... | 455/313 |
| 8,417,192 B2 * | 4/2013 | Brady et al. | ..................... | 455/73 |
| 8,600,316 B2 * | 12/2013 | Lum et al. | ....................... | 455/78 |
| 8,706,066 B2 * | 4/2014 | Arlotta | .......................... | 455/140 |
| 2002/0049075 A1 * | 4/2002 | Takagi | ........................... | 455/553 |
| 2003/0078011 A1 * | 4/2003 | Cheng et al. | .................... | 455/73 |
| 2003/0193923 A1 * | 10/2003 | Abdelgany et al. | ........... | 370/342 |
| 2004/0097210 A1 * | 5/2004 | Sato | .............................. | 455/260 |
| 2005/0032493 A1 * | 2/2005 | Sugiyama et al. | ......... | 455/168.1 |
| 2005/0202842 A1 * | 9/2005 | Brobston et al. | ........... | 455/552.1 |
| 2005/0227631 A1 * | 10/2005 | Robinett | ........................ | 455/83 |

(Continued)

FOREIGN PATENT DOCUMENTS

| | | |
|---|---|---|
| JP | 2004-129066 | 4/2004 |
| JP | 2007-019939 | 1/2007 |

(Continued)

*Primary Examiner* — Gennadiy Tsvey
(74) *Attorney, Agent, or Firm* — Harness, Dickey & Pierce, PLC (57) ABSTRACT

In a case where a wireless communication device corresponds to a first-region wireless communication system, a first reception block and a second reception block receives a radio signal of the first-region wireless communication system in a diversity scheme and a transmission block transmits a radio signal of the first-region wireless communication system. In a case where the wireless communication device corresponds to a first second-region wireless communication system and a second second-region wireless communication system, the second reception block receives a radio signal of the first second-region wireless communication system, the first reception block receives a radio signal of the second second-region wireless communication system, and the transmission block transmits a radio signal of the first second-region wireless communication system and a radio signal of the second second-region wireless communication system with time division switching.

5 Claims, 8 Drawing Sheets

(56) References Cited

U.S. PATENT DOCUMENTS

| | | | |
|---|---|---|---|
| 2005/0288054 A1* | 12/2005 | Sakaniwa | 455/550.1 |
| 2006/0141944 A1* | 6/2006 | Shibagaki et al. | 455/78 |
| 2006/0211390 A1* | 9/2006 | Uozumi et al. | 455/180.3 |
| 2006/0281488 A1* | 12/2006 | Chang et al. | 455/553.1 |
| 2007/0008945 A1* | 1/2007 | Son et al. | 370/344 |
| 2007/0021080 A1 | 1/2007 | Kuriyama et al. | |
| 2007/0243832 A1* | 10/2007 | Park et al. | 455/73 |
| 2007/0280185 A1* | 12/2007 | McFarland et al. | 370/338 |
| 2008/0051129 A1* | 2/2008 | Abe et al. | 455/550.1 |
| 2008/0070515 A1* | 3/2008 | Totsuka et al. | 455/82 |
| 2008/0137560 A1* | 6/2008 | Totsuka et al. | 370/276 |
| 2008/0225971 A1* | 9/2008 | Behzad | 375/260 |
| 2009/0156135 A1* | 6/2009 | Kamizuma et al. | 455/73 |
| 2009/0233642 A1* | 9/2009 | Zhitnitsky | 455/552.1 |
| 2010/0238844 A1 | 9/2010 | Kanou | |
| 2011/0128992 A1* | 6/2011 | Maeda et al. | 375/130 |
| 2011/0158081 A1* | 6/2011 | Wang et al. | 370/201 |
| 2011/0260806 A1* | 10/2011 | Takeuchi | 333/103 |
| 2012/0069876 A1* | 3/2012 | Kamizuma et al. | 375/219 |
| 2013/0029613 A1* | 1/2013 | Haralabidis et al. | 455/75 |

FOREIGN PATENT DOCUMENTS

| | | |
|---|---|---|
| JP | 2007-267319 | 10/2007 |
| JP | 2008-011329 | 1/2008 |
| JP | 2008-113149 | 5/2008 |
| JP | 4089369 B2 | 5/2008 |
| JP | 4368675 B2 | 11/2009 |
| WO | 2007/119568 | 10/2007 |

* cited by examiner

| | RADIO SIGNAL | MIXER (FIRST STAGE) | FIRST INTERMEDIATE FREQUENCY SIGNAL | MIXER (SECOND STAGE) | SECOND INTERMEDIATE FREQUENCY SIGNAL |
|---|---|---|---|---|---|
| WAVE RECEPTION 700[MHz] | 760 | 21, 22<br>Lo=12160/2/8<br>=760[MHz] | 0 | — | — |
| WAVE TRANSMISSION 700[MHz] | 760 | 47, 48<br>Lo=12160/2/8<br>=760[MHz] | 0 | — | — |
| DSRC RECEPTION 5.8[GHz] | 5775 5805 | 15, 16<br>Lo=12160/2<br>=6080[MHz] | 275 305 | 23, 24<br>Lo=12160/38<br>=320[MHz] | 15 45 |

FIG. 6

| | RADIO SIGNAL | MIXER | INTERMEDIATE FREQUENCY SIGNAL |
|---|---|---|---|
| DSRC RECEPTION 5.8[GHz] | 5775 ... 5805 | 15, 16<br>Lo=(11630 – 11690)/2<br>=5815 – 5845[MHz] | 40 |
| DSRC TRANSMISSION 5.8[GHz] | 5815 ... 5845 | 45, 46<br>Lo=(11630 – 11690)/2<br>=5815 – 5845[MHz] | 0 |
| WAVE RECEPTION 700[MHz] | 760 | 21, 22<br>Lo=(11630 – 11690)/2/8<br>=726.875 – 730.625[MHz] | 29.375 ... 33.125 |

FIG. 7

WIRELESS COMMUNICATION DEVICE

CROSS REFERENCE TO RELATED APPLICATIONS

The present application is based on and claims priority to Japanese Patent Application No. 2011-240171 filed on Nov. 1, 2011, the contents of which are incorporated in their entirety herein by reference.

TECHNICAL FIELD

The present disclosure relates to a wireless communication device.

BACKGROUND

A wireless access in vehicle environment (WAVE) system applied to vehicle-to-vehicle communications and road-to-vehicle communications has been developed in many regions including Japan, North America, and Europe. In the WAVE system, a usage frequency band is different from region to region. In Japan, a 700 MHz band is used. In North America and Europe, a 5.9 GHz band is used. In Japan, a dedicated short range communications (DSRC) (Japanese Registered Trademark) applied to an electronic toll collection (ETC) (Japanese Registered Trademark) system is put into practice. The DSRC system uses a 5.8 GHz band.

Because of the above-described factors, manufacturers of wireless integrated circuit (IC) manufacture an IC corresponding to each system. However, because available efficiency depends on quantity and infrastructure facilities in the nature of the application, it is required to be a low cost. As one of means for achieving a low cost, an integrated wireless large scale integration (LSI) corresponding to each system has been studied. However, in order to receive a wireless signal in each system, a reception block corresponding to each system needs to be mounted. However, in a case where a reception block corresponding to each system is mounted, a reception block corresponding to the WAVE system in a second region (e.g., Japan) and a reception block corresponding to the DSRC system in the second region are redundant when the integrated wireless LSI is used in a first region (e.g., North America and Europe). On the other hand, the reception block corresponding to the WAVE system in the first region is redundant when the integrated wireless LSI is used in the second region.

As a technology intended for a plurality of wireless communication systems, Japanese Patent No. 4,368,675 (patent document No. 1) discloses a technique that is intended for a global positioning system (GPS), an ETC, a vehicle information and communication system (VICS) (Japanese Registered Trademark) and a wireless local area network (LAN) and that demodulates wireless signals of the wireless communication systems in parallel. Japanese Patent No. 4,089,369 (patent document No. 2) discloses that when a vehicle approaches an equipment of ETC on a road, a communication with a wireless LAN is not performed.

However, in the technique disclosed in the patent documents No. 1 and No. 2, it is assumed to be used in only one region and is not assumed to be used in a plurality of regions. Thus, the technique does not solve the issue that the reception block corresponding to the WAVE system in the second region and the reception block corresponding to the DSRC system in the second region are redundant when used in the first region, and the reception block corresponding to the WAVE system in the first system is redundant when used in the second region.

SUMMARY

It is an object of the present disclosure to provide a wireless communication device that can restrict a redundant configuration when used in either a first region or a second region where a frequency band and a wireless communication system to be used is different from each other.

A wireless communication device according to an aspect of the present disclosure corresponds to a first-region wireless communication system used in a first region, a first second-region wireless communication system used in a second region that is different from the first region, and a second second-region wireless communication system used in the second region. The first second-region wireless communication system and the second second-region wireless communication system use different frequency bands. The wireless communication device includes a wireless processor and a baseband processor. The wireless processor includes a first reception block, a second reception block, and a transmission block. The baseband processor includes a first modem that processes an intermediate frequency signal of a first wireless communication system, a second modem that processes an intermediate frequency signal of a second wireless communication system, and a frequency conversion section that coverts a frequency of an intermediate frequency signal.

In a first-region correspondence case in which the wireless communication device corresponds to the first-region wireless communication system, the first reception block and the second reception block receives a radio signal of the first-region wireless communication system in a diversity scheme and the transmission block transmits a radio signal of the first-region wireless communication system.

In a second-region correspondence case in which the wireless communication device corresponds to the first second-region wireless communication system and the second second-region wireless communication system, the second reception block receives a radio signal of the first second-region wireless communication system, the first reception block receives a radio signal of the second second-region wireless communication system, and the transmission block transmits a radio signal of the first second-region wireless communication system and a radio signal of the second second-region wireless communication system with time division switching.

In the first-region correspondence case, the first modem processes an intermediate frequency signal that is obtained by converting a frequency of the radio signal received by the first reception block and the second reception block in the diversity scheme.

When the transmission block transmits the radio signal of the first second-region wireless communication system in the second-region correspondence case, the first modem processes an intermediate frequency signal that is obtained by converting a frequency of the radio signal received by the second reception block, and after the frequency conversion section converts a frequency of an intermediate frequency signal that is obtained by converting a frequency of the radio signal received by the first reception block, the second modem processes, the intermediate frequency signal whose frequency is converted by the frequency conversion section.

When the transmission block transmits the radio signal of the second second-region wireless communication system in the second-region correspondence case, the second modem processes an intermediate frequency signal that is obtained by converting a frequency of the radio signal received by the first reception block, and after the frequency conversion section converts a frequency of an intermediate frequency signal that is obtained by converting a frequency of the radio signal received by the second reception block, the first modem processes the intermediate frequency signal whose frequency is converted by the frequency conversion section.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
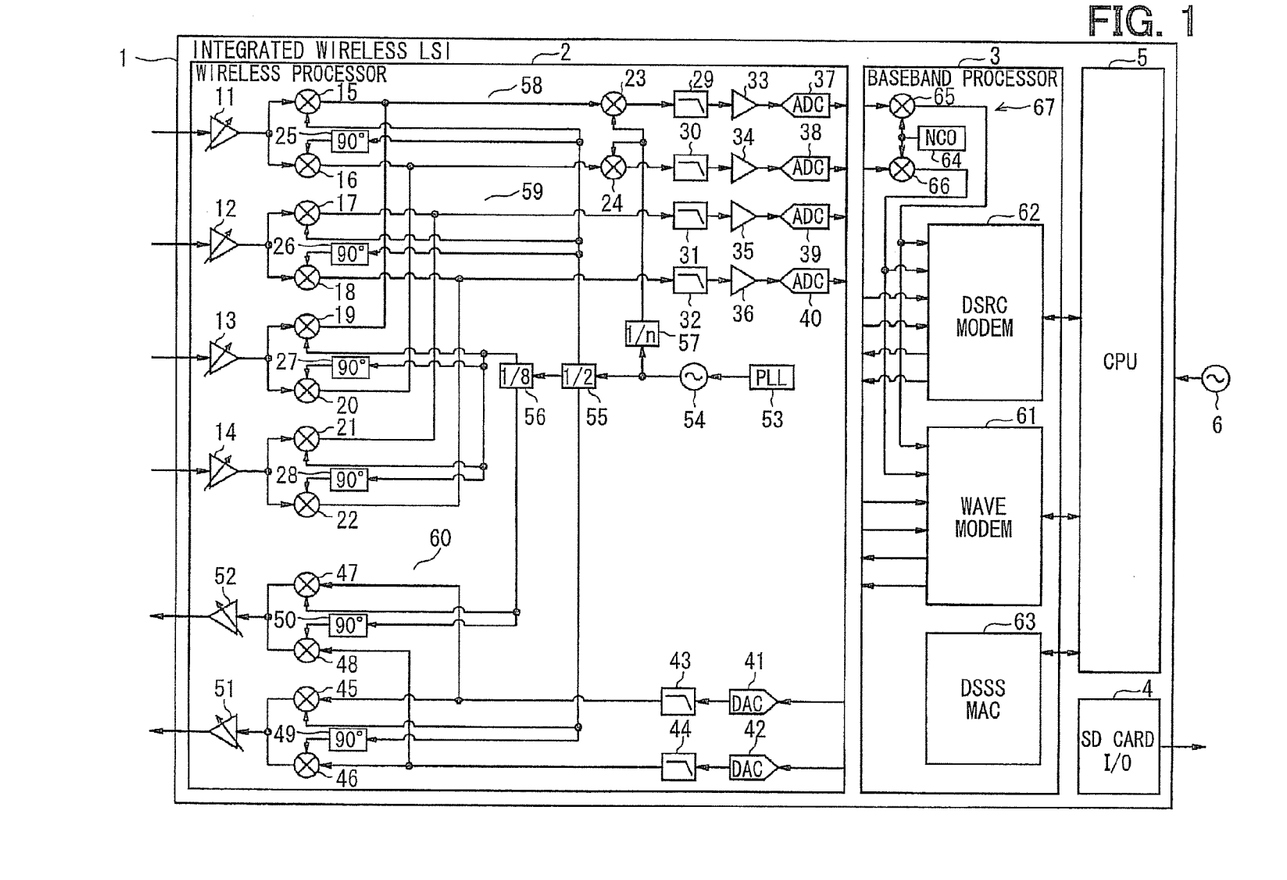
FIG. 1 is a functional block diagram showing an integrated wireless LSI according to an exemplary embodiment of the present disclosure.

An exemplary embodiment of the present disclosure will be described with reference to the drawings. In the present embodiment, a first region includes North America and Europe and a second region includes Japan. An integrated wireless LSI 1 is included in a wireless communication device mounted on a vehicle. The integrated wireless LSI 1 includes a wireless processor 2, a baseband processor 3, a secure digital (SD) card input output portion 4, and a central processing unit (CPU) 5. The integrated wireless LSI 1 can be applied to a WAVE system in the first region using a 5.9 GHz band, a WAVE system in the second region using a 700 MHz band, and a DSRC system in the second region using a 5.8 GHz band. The WAVE systems in the first region and the second regions are applied, for example, to vehicle-to-vehicle communications or road-to-vehicle communications for restricting a vehicle collision. The DSRC system in the second region is applied to an ETC system. The WAVE systems in the first region and the second regions are wide area systems. The DSRC system in the second region is a narrow area system in which a spot communication is performed. Thus, when the wireless communication device is used in the second region, the WAVE system in the second region is used more frequently than the DSRC system in the second region.

The WAVE system in the first region using the 5.9 GHz band and the WAVE system in the second region using the 700 MHz band are examples of a first wireless communication system. The DSRC system in the second region using the 5.8 GHz band is an example of a second wireless communication system. In addition, the WAVE system in the first region using the 5.9 GHz band is an example of a first-region wireless communication system, the WAVE system in the second region using the 700 MHz band is an example of a first second-region wireless communication system, and the DSRC system in the second region using the 5.8 GHz band is an example of a second second-region wireless communication system. The integrated wireless LSI 1 uses a clock signal transmitted from an oscillator 6 as an operation clock.

The wireless processor 2 includes a first reception amplifier 11, a second reception amplifier 12, a third reception amplifier 13, a fourth reception amplifier, a first reception mixer 15, a second reception mixer 16, a third reception mixer 17, a fourth reception mixer 18, a fifth reception mixer 19, a sixth reception mixer 20, a seventh reception mixer 21, an eighth reception mixer 22, a ninth reception mixer 23, a tenth reception mixer 24, a first reception phase shifter 25, a second reception phase shifter 26, a third reception phase shifter 27, a fourth reception phase shifter 28, a first reception low-pass filter (LPF) 29, a second reception LPF 30, a third reception LPF 31, a fourth reception LPF 32, a first amplifier 33, a second amplifier 34, a third amplifier 35, a fourth amplifier 36, a first analog-to-digital (A/D) converter (ADC) 37, a second A/D converter 38, a third A/D converter 39, and a fourth A/D converter 40 as functional blocks in a reception block. The reception block receives radio signals from communication networks including infrastructures of the WAVE systems in the first region and the second region and infrastructures of the DSRC system in the second region. The first to fourth reception amplifiers 11-14 have changeable gain. The first to fourth reception phase shifters 25-28 shift phases by 90 degrees.

The wireless processor 2 includes a first digital to analog (D/A) converter (DAC) 41, a second D/A converter 42, a first transmission LPF 43, a second transmission LPF 44, a first transmission mixer 45, a second transmission mixer 46, a third transmission mixer 47, a fourth transmission mixer 48, a first transmission phase shifter 49, a second transmission phase shifter 50, a first transmission amplifier 51, and a second transmission amplifier 52 as functional blocks in a transmission block for transmitting radio signals to the communication networks. The wireless processor 2 further includes a phase-locked loop (PPL) circuit 53, an oscillator 54, a ½ divider 55, a ⅛ divider 56, and a 1/n (n is a natural number) divider 57 as functional blocks shared by the reception block and the transmission block. The PLL circuit 53 includes a phase frequency detector (PFD), a loop filter, and a voltage controlled oscillator (VCO). The first and second transmission amplifiers 51, 52 have changeable gain. The first and second transmission phase shifters 49, 50 shift phases by 90 degrees.

Firstly, the functional blocks in the reception block will be described below. The first reception amplifier 11 amplifies a radio signal transmitted from an antenna (not shown) and transmits the radio signal to the first reception mixer 15 and the second reception mixer 16. The first reception mixer 15 mixes the radio signal transmitted from the first reception amplifier 11 and a local signal transmitted from the ½ divider 55 to generate a first intermediate frequency signal. Then, the first reception mixer 15 transmits the first intermediate frequency signal to the ninth reception mixer 23. The ninth reception mixer 23 mixes the first intermediate frequency signal transmitted from the first reception mixer 15 and a local signal transmitted from the 1/n divider 57 to generate a second intermediate frequency signal. Then, the ninth reception mixer 23 transmits the second intermediate frequency signal to the first reception LPF 29. The first reception LPF 29 removes a high-frequency component from the second intermediate frequency signal transmitted from the ninth reception mixer 23. Then, the first reception LPF 29 transmits the second intermediate frequency signal, from which the high-frequency component is removed, to the first amplifier 33. The first amplifier 33 amplifies the second intermediate frequency signal transmitted from the first reception LPF 29 and transmits the second intermediate frequency signal to the first A/D converter 37. The first A/D converter 37 coverts the second intermediate frequency signal transmitted from the first amplifier 33 from an analog signal to a digital signal and transmits the second intermediate frequency signal to the baseband processor 3.

The second reception mixer 16 mixes the radio signal transmitted from the first reception amplifier 11 and a local signal transmitted from ½ divider 55 via the first reception phase shifter 25 to generate a first intermediate frequency signal. Then, the second reception mixer 16 transmits the first intermediate frequency signal to the tenth reception mixer 24. The tenth reception mixer 24 mixes the first intermediate frequency signal transmitted from the second reception mixer 16 and a local signal transmitted from the 1/n divider 57 to generate a second intermediate frequency signal. Then, the tenth reception mixer 24 transmits the second intermediate frequency signal to the second reception LPF 30. The second reception LPF 30 removes a high-frequency component from the second intermediate frequency signal transmitted from the tenth reception mixer 24. Then, the second reception LPF 30 transmits the second intermediate frequency signal, from which the high-frequency component is removed, to the second amplifier 34. The second amplifier 34 amplifies the second intermediate frequency signal transmitted from the second reception LPF 30 and transmits the second intermediate frequency signal to the second A/D converter 38. The second A/D converter 38 coverts the second intermediate frequency signal transmitted from the second amplifier 34 from an analog signal to a digital signal and transmits the second intermediate frequency signal to the baseband processor 3.

The second reception amplifier 12 amplifies a radio signal transmitted from the antenna and transmits the radio signal to the third reception mixer 17 and the fourth reception mixer 18. The third reception mixer 17 mixes the radio signal transmitted from the second reception amplifier 12 and a local signal transmitted from the ½ divider 55 to generate a first intermediate frequency signal. Then, the third reception mixer 17 transmits the first intermediate frequency signal to the third reception LPF 31. The third reception LPF 31 removes a high-frequency component from the first intermediate frequency signal transmitted from the third reception mixer 17. Then, the third reception LPF 31 transmits the first intermediate frequency signal, from which the high-frequency component is removed, to the third amplifier 35. The third amplifier 35 amplifies the first intermediate frequency signal transmitted from the third reception LPF 31 and transmits the first intermediate frequency signal to the third A/D converter 39. The third A/D converter 39 coverts the first intermediate frequency signal transmitted from the third amplifier 35 from an analog signal to a digital signal and transmits the first intermediate frequency signal to the baseband processor 3.

The fourth reception mixer 18 mixes the radio signal transmitted from the second reception amplifier 12 and a local signal transmitted from ½ divider 55 via the second reception phase shifter 26 to generate a first intermediate frequency signal. Then, the fourth reception mixer 18 transmits the first intermediate frequency signal to the fourth reception LPF 32. The fourth reception LPF 32 removes a high-frequency component from the first intermediate frequency signal transmitted from the fourth reception mixer 18. Then, the fourth reception LPF 32 transmits the first intermediate frequency signal, from which the high-frequency component is removed, to the fourth amplifier 36. The fourth amplifier 36 amplifies the first intermediate frequency signal transmitted from the fourth reception LPF 32 and transmits the first intermediate frequency signal to the fourth A/D converter 40. The fourth A/D converter 40 coverts the first intermediate frequency signal transmitted from the fourth amplifier 36 from an analog signal to a digital signal and transmits the first intermediate frequency signal to the baseband processor 3.

The third reception amplifier 13 amplifies a radio signal transmitted from the antenna and transmits the radio signal to the fifth reception mixer 19 and the sixth reception mixer 20. The fifth reception mixer 19 mixes the radio signal transmitted from the third reception amplifier 13 and a local signal transmitted from the ⅛ divider 56 to generate a first intermediate frequency signal. Then, the fifth reception mixer 19 transmits the first intermediate frequency signal to the ninth reception mixer 23. The sixth reception mixer 20 mixes the radio signal transmitted from the third reception amplifier 13 and a local signal transmitted from the ⅛ divider 56 via the third reception phase shifter 27 to generate a first intermediate frequency signal. Then, the sixth reception mixer 20 transmits the first intermediate frequency signal to the tenth reception mixer 24.

The fourth reception amplifier 14 amplifies a radio signal transmitted from the antenna and transmits the radio signal to the seventh reception mixer 21 and the eighth reception mixer 22. The seventh reception mixer 21 mixes the radio signal transmitted from the fourth reception amplifier 14 and a local signal transmitted from the ⅛ divider 56 to generate a first intermediate frequency signal. Then, the seventh reception mixer 21 transmits the first intermediate frequency signal to the third reception LPF 31. The eighth reception mixer 22 mixes the radio signal transmitted from the fourth reception amplifier 14 and a local signal transmitted from the ⅛ divider 56 via the fourth reception phase shifter 28 to generate a first intermediate frequency signal. Then, the eighth reception mixer 22 transmits the first intermediate frequency signal to the fourth reception LPF 32.

The first reception amplifier 11, the first reception mixer 15, the second reception mixer 16, the first reception phase shifter 25, the third reception amplifier 13, the fifth reception mixer 19, the sixth reception mixer 20, the third reception phase shifter 27, the ninth reception mixer 23, the tenth reception mixer 24, the first reception LPF 29, the second reception LPF 30, the first amplifier 33, the second amplifier 34, the first A/D converter 37, the second A/D converter 38 form a first reception block 58. When operations of the ninth reception mixer 23 and the tenth reception mixer 24 are activated, the first reception block 58 performs two-stage frequency conversion (i.e., double conversion). When the ninth reception mixer 23 and the tenth reception mixer 24 are deactivated, the first reception block 58 performs one-stage frequency conversion (i.e., single conversion).

The second reception amplifier 12, the third reception mixer 17, the fourth reception mixer 18, the second reception phase shifter 26, the fourth reception amplifier 14, the seventh reception mixer 21, the eighth reception mixer 22, the fourth reception phase shifter 28, the reception LPF 31, the fourth reception LPF 32, the third amplifier 35, the fourth amplifier 36, the third A/D converter 39, the fourth A/D converter 40 form a second reception block 59. The second reception block 59 always performs one-stage frequency conversion.

Next, the functional blocks in the transmission block will be described. The first D/A converter 41 converts an intermediate frequency signal transmitted from the baseband processor 3 from a digital signal to an analog signal and transmits the intermediate frequency signal to the first transmission LPF 43. The first transmission LPF 43 removes a high-frequency component from the intermediate frequency signal transmitted from the first D/A converter 41, and transmits the intermediate frequency signal, from which the high-frequency component is removed, to the first transmission mixer 45 and the third transmission mixer 47. The second D/A converter 42 converts an intermediate frequency signal transmitted from the baseband processor 3 from a digital signal to an analog signal and transmits the intermediate frequency signal to the second transmission LPF 44. The second transmission LPF 44 removes a high-frequency component from the intermediate frequency signal transmitted from the second D/A converter 42, and transmits the intermediate frequency signal, from which the high-frequency component is removed, to the second transmission mixer 46 and the fourth transmission mixer 48.

The first transmission mixer 45 mixes the intermediate frequency signal transmitted from the first transmission LPF 43 and a local signal transmitted from the ½ divider 55 to generate a radio signal. Then, the first transmission mixer 45 transmits the radio signal to the first transmission amplifier 51. The second transmission mixer 46 mixes the intermediate frequency signal transmitted from the second transmission LPF 44 and a local signal transmitted from the ½ divider 55 via the first transmission phase shifter 49 to generate a radio signal. Then, the second transmission mixer 46 transmits the radio signal to the first transmission amplifier 51. The first transmission amplifier 51 amplifies the radio signal transmitted from the first transmission mixer 45 and the radio signal transmitted from the second transmission mixer 46 and transmits the radio signals from the antenna.

The third transmission mixer 47 mixes the intermediate frequency signal transmitted from the first transmission LPF 43 and a local signal transmitted from the ⅛ divider 56 to generate a radio signal. Then, the third transmission mixer 47 transmits the radio signal to the second transmission amplifier 52. The fourth transmission mixer 48 mixes the intermediate frequency signal transmitted from the second transmission LPF 44 and a local signal transmitted from the ⅛ divider 56 via the second transmission phase shifter 50 to generate a radio signal. Then, the fourth transmission mixer 48 transmits the radio signal to the second transmission amplifier 52. The second transmission amplifier 52 amplifies the radio signal transmitted from the third transmission mixer 47 and the radio signal transmitted from the fourth transmission mixer 48 and transmits the radio signals from the antenna.

The first D/A converter 41, the second D/A converter 42, the first transmission LPF 43, the second transmission LPF 44, the first transmission mixer 45, the second transmission mixer 46, the third transmission mixer 47, the fourth transmission mixer 48, the first transmission phase shifter 49, the second transmission phase shifter 50, the first transmission amplifier 51, and the second transmission amplifier 52 form a transmission block 60.

The baseband processor 3 includes a WAVE modem 61, a DSRC modem 62, a driving safety support systems (DSSS) MAC 63, a numerical controlled oscillators (NCO) 64, a first mixer 65, and a second mixer 66.

The WAVE modem 61 receives an intermediate frequency signal with 0 MHz. The WAVE modem 61 demodulates the intermediate frequency signal of the WAVE system in the first region using the 5.9 GHz band and the intermediate frequency signal of the WAVE system in the second region using the 700 MHz band, which are transmitted from the wireless processor 2. In addition, the WAVE modem 61 generates an intermediate frequency signal of the WAVE system in the first region using the 5.9 GHz band and an intermediate frequency signal of the WAVE system in the second region using the 700 MHz band, modulates the intermediate frequency signals, and transmits the intermediate frequency signals after modulation to the wireless processor 2. The WAVE modem 61 is an example of a first modem.

The DSRC modem 62 receives an intermediate frequency signal with 40 MHz. The DSRC modem 62 demodulates the intermediate frequency signal of the DSRC system in the second region using the 5.8 GHz band, which is transmitted from the wireless processor 2. In addition, the DSRC modem 62 generates an intermediate frequency signal of the DSRC system in the second region using the 5.8 GHz band, modulates the intermediate frequency signal, and transmits the intermediate frequency signal after modulation to the wireless processor 2. The DSRC modem 62 is an example of a second modem.

The NCO 64, the first mixer 65, and the second mixer 66 form a frequency conversion section 67. The NCO 64 has a higher accuracy, a higher stability, and a higher reliability than the VCO of the PLL circuit 53. A signal transmitted from the frequency conversion section 67 (the first mixer 65 and the second mixer 66) is selectively input to one of the WAVE modem 61 and the DSRC modem 62.

The SD card input output portion 4 performs data communication with a SD card and reads data stored in the SD card. The CPU 5 executes a control program stored therein to control operations of the wireless processor 2, the baseband processor 3, and the SD card input output portion 4. The CPU 5 switches between a first-region operation mode and a second-region operation mode. In the first-region operation mode, it is assumed that the wireless communication device is used in the first region, and the wireless processor 2 and the baseband processor 3 correspond to the WAVE system in the first region using the 5.9 GHz band. In the second-region operation mode, it is assumed that the wireless communication device is used in the second region, and the wireless processor 2 and the baseband processor 3 correspond to the WAVE system in the second region using the 700 MHz band and the DSRC system in the second region using the 5.8 GHz band. (I) A case in which the wireless processor 2 and the baseband processor 3 operate in the first-region operation mode and (II) a case in which the wireless processor 2 and the baseband processor 3 operate in the second-region operation mode will be described successively.

Figure 2:
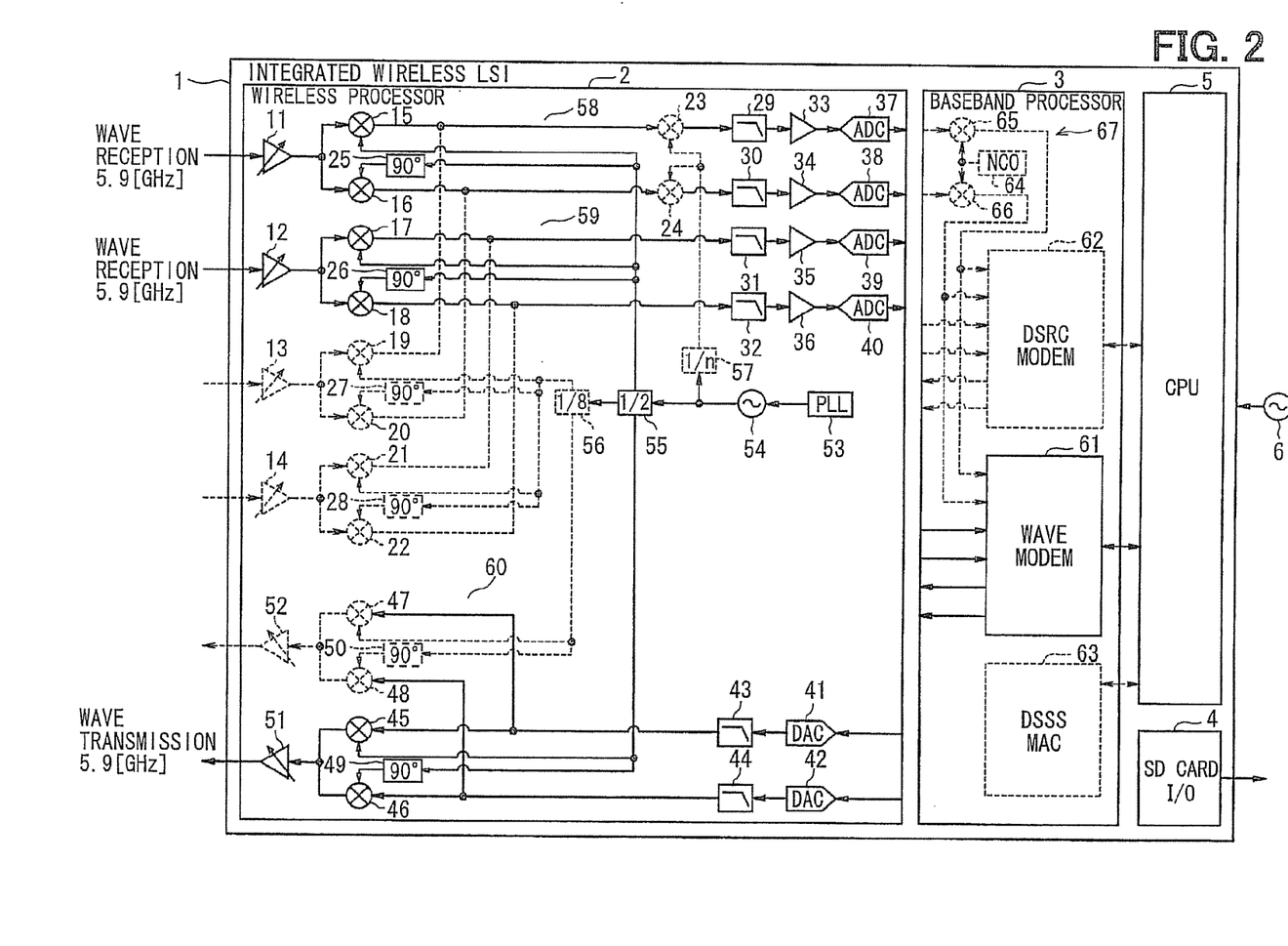
FIG. 2 is a diagram showing functional blocks which are active when the integrated wireless LSI is in a first-region operation mode.

(I) The Case in which the Wireless Processor 2 and the Baseband Processor 3 Operate in the First-Region Operation Mode When the CPU 5 controls the wireless processor 2 and the baseband processor 3 to operate in the first-region operation mode, as shown in FIG. 2, the CPU 5 temporarily deactivates the functional block in which the radio signal is received at the third reception amplifier 13 and the functional block in which the radio signal is received at the fourth reception amplifier 14, which are included in the functional blocks in the reception block, the ninth reception mixer 23, and the tenth reception mixer 24. The functional block in which the radio signal is received at the third reception amplifier 13 includes the third reception amplifier 13, the fifth reception mixer 19, the sixth reception mixer 20, and the third reception phase shifter 27. The functional block in which the radio signal is received at the fourth reception amplifier 14 includes the fourth reception amplifier 14, the seventh reception mixer 21, the eighth reception mixer 22, and the fourth reception phase shifter 28. In addition, the CPU 5 temporarily deactivates the functional block in which the radio signal is transmitted from the second transmission amplifier 52, which is included in the functional blocks in the transmission block. The functional block in which the radio signal is transmitted from the second transmission amplifier 52 includes the third transmission mixer 47, the fourth transmission mixer 48, the second transmission phase shifter 50, and the second transmission amplifier 52. Furthermore, the CPU 5 temporarily deactivates the ⅛ divider 56 and the 1/n divider 57 included in the functional block shared by the reception block and the transmission block.

Furthermore, the CPU 5 temporarily deactivates the DSRC modem 62, the DSSS MAC 63, the frequency conversion section 67 in the baseband processor 3. The CPU 5 activates the other functional blocks in the wireless processor 2 and the baseband processor 3. In FIG. 2, the functional blocks temporarily deactivated by the CPU 5 are shown by dashed lines and the functional blocks activated by the CPU 5 are shown by solid lines. "The ninth reception mixer 23 and the tenth reception mixer 24 are temporarily deactivated" means that the intermediate frequency signals input to the ninth reception mixer 23 and the tenth reception mixer 24 are output without frequency conversion.

In the present case, the intermediate frequency signals of the WAVE system in the first region transmitted from the first A/D converter 37 to the fourth A/D converter 40 in the wireless processor 2 are input to the WAVE modem 61 in the baseband processor 3 and are demodulated. The CPU 5 considers circumstances that a reception efficiency is not high in the WAVE system in the first region and temporarily deactivate the ninth reception mixer 23 and the tenth reception mixer 24 so that the first reception block 58 performs one-stage frequency conversion. Accordingly, the first reception block 58 and the second reception block 59 have similar configurations, and the radio signal in the 5.9 GHz band of the WAVE system in the first region is received by the first reception block 58 and the second reception block 59 in a diversity scheme. The CPU 5 compares a received signal strength indication (RSSI) of the radio signal transmitted to the first reception amplifier 11 and the RSSI of the radio signal transmitted to the second reception amplifier 12, and the CPU 5 sets the intermediate frequency signal corresponding to the radio signal whose RSSI is higher to be effective. The intermediated frequency signal modulated by the WAVE modem 61 in the baseband processor 3 is transmitted to the first D/A converter 41 and the second D/A converter 42 in the wireless processor 2.

(II) The Case in which the Wireless Processor 2 and the Baseband Processor 3 Operate in the Second Region Operation Mode When the CPU 5 controls the wireless processor 2 and the baseband processor 3 to operate in the second region operation mode, a radio signal in the 700 MHz band of the WAVE system in the second region and a radio signal in the 5.8 GHz band of DSRC system is transmitted with time division switching.

Figure 3:
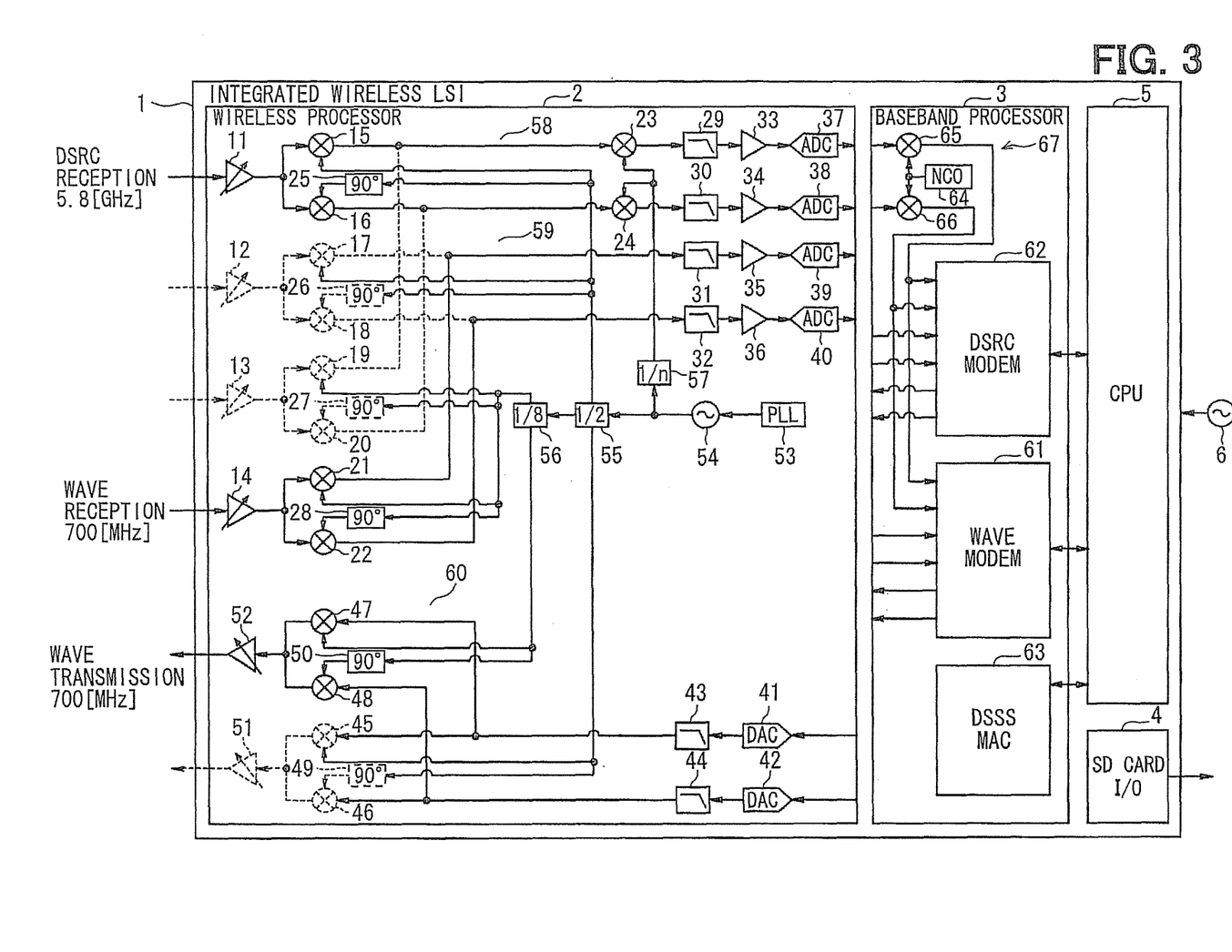
FIG. 3 is a diagram showing functional blocks which are active when a radio signal in a 700 MHz band of a WAVE system in a second region is transmitted in a second-region operation mode.

When the radio signal in the 700 MHz band of the WAVE system in the second region is transmitted, as shown in FIG. 3, the CPU 5 temporarily deactivates the functional block in which the radio signal is received at the second reception amplifier 12, the functional block in which the radio signal is received at the third reception amplifier 13, which are included in the functional blocks in the reception block. The functional block in which the radio signal is received at the second reception amplifier 12 includes the second reception amplifier 12, the third reception mixer 17, the fourth reception mixer 18, and the second reception phase shifter 26. The functional block in which the radio signal is received at the third reception amplifier 13 includes the third reception amplifier 13, the fifth reception mixer 19, the sixth reception mixer 20, and the third reception phase shifter 27. In addition, the CPU 5 temporarily deactivates the functional block in which the radio signal is transmitted from the first transmission amplifier 51, which is included in the functional blocks in the transmission block. The functional block in which the radio signal is transmitted from the first transmission amplifier 51 includes the first transmission mixer 45, the second transmission mixer 46, the first transmission phase shifter 49, and the first transmission amplifier 51. The CPU 5 activates the other functional blocks in the wireless processor 2 and the baseband processor 3. Also in FIG. 3, the functional blocks temporarily deactivated by the CPU 5 are shown by dashed lines and the functional blocks activated by the CPU 5 are shown by solid lines.

Figure 5:
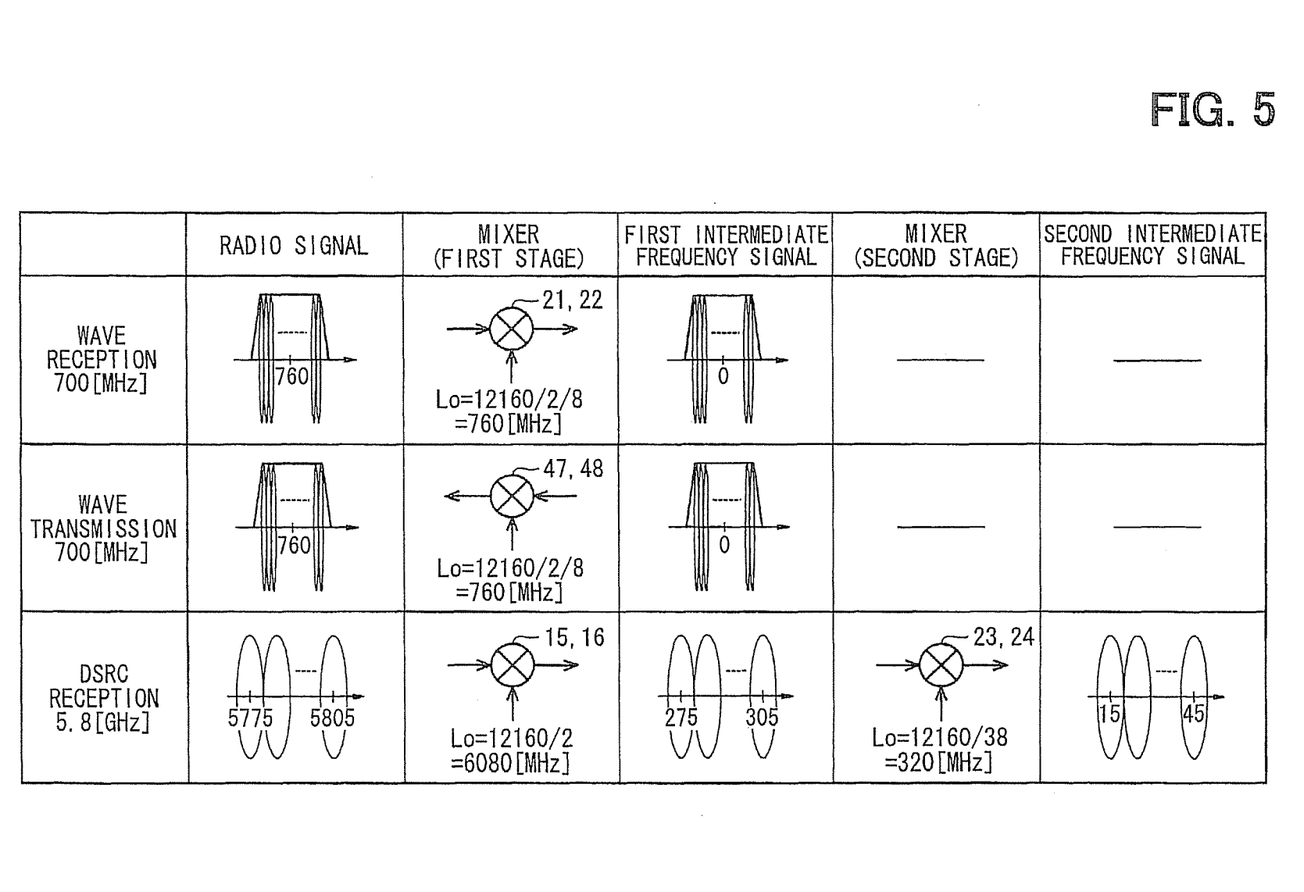
FIG. 5 is a diagram showing a frequency plan when a radio signal in the 700 MHz band of the WAVE system in the second region is transmitted.

FIG. 5 is a diagram showing a frequency plan when the radio signal in the 700 MHz band of the WAVE system in the second region is transmitted. The CPU 5 sets an oscillated frequency of the VCO of the PLL circuit 53 to be 12160 MHz. Accordingly, local signals of 760 (=12160/2/8) MHz are transmitted to the seventh reception mixer 21 and the eighth reception mixer 22, which are included in the reception block of the 700 MHZ band of the WAVE system in the second region, local signals of 760 MHz are transmitted to the third transmission mixer 47 and the fourth transmission mixer 48, which are included in the transmission block of the 700 MHz band in the WAVE system in the second region, and local signals of 6080 (=12160/2) MHz are transmitted to the first reception mixer 15 and the second reception mixer 16, which are included in the reception block of the 5.8 GHz band of the DSRC system in the second region. Furthermore, the CPU 5 sets a division ratio of the 1/n divider 57 to be 38 so that local signals of 320 (=12160/38) MHz are transmitted to the ninth reception mixer 23 and the tenth reception mixer 24.

Because the intermediate frequency signals of the WAVE system in the second region transmitted from the third A/D converter 39 and the fourth A/D converter 40 in the wireless processor 2 are 0 MHz, the intermediate frequency signals are directly transmitted to the WAVE modem 61 in the baseband processor 3 and are demodulated. The intermediate frequency signals modulated by the WAVE modem 61 in the baseband processor 3 are transmitted to the first D/A converter 41 and the second D/A converter 42 in the wireless processor 2.

The intermediate frequency signals of the DSRC system in the second region transmitted from the first A/D converter 37 and the second A/D converter 38 in the wireless processor 2 are in a range from 15 to 45 MHz. After the intermediate frequency signals are treated with the frequency conversion section 67 to be 40 MHz, the intermediate frequency signals are demodulated by the DSRC modem 62. In other words, when the radio signal in the 700 MHz band of the WAVE system in the second region is transmitted, the oscillated frequency from the VCO of the PLL circuit 53 is selected to correspond to the 700 MHz band of the WAVE system in the second region, the intermediate frequency signal of the DSRC system in the second region is treated with frequency conversion by the frequency conversion section 67 to be 40 MHz.

In this case, the CPU 5 does not temporarily deactivate the ninth reception mixer 23 and the tenth reception mixer 24, and the first reception block 58 performs the two-stage frequency conversion. In other words, the radio signal in the 5.9 GHz band of the WAVE system in the first region is treated with one-stage frequency conversion, and the radio signal in the 5.8 GHz band of the DSRC system is treated with the two-stage frequency conversion. Accordingly, the VCO of the PLL circuit 53, which needs a large mount space as an LSI, can be shared, and a size of the LSI can be reduced.

Figure 4:
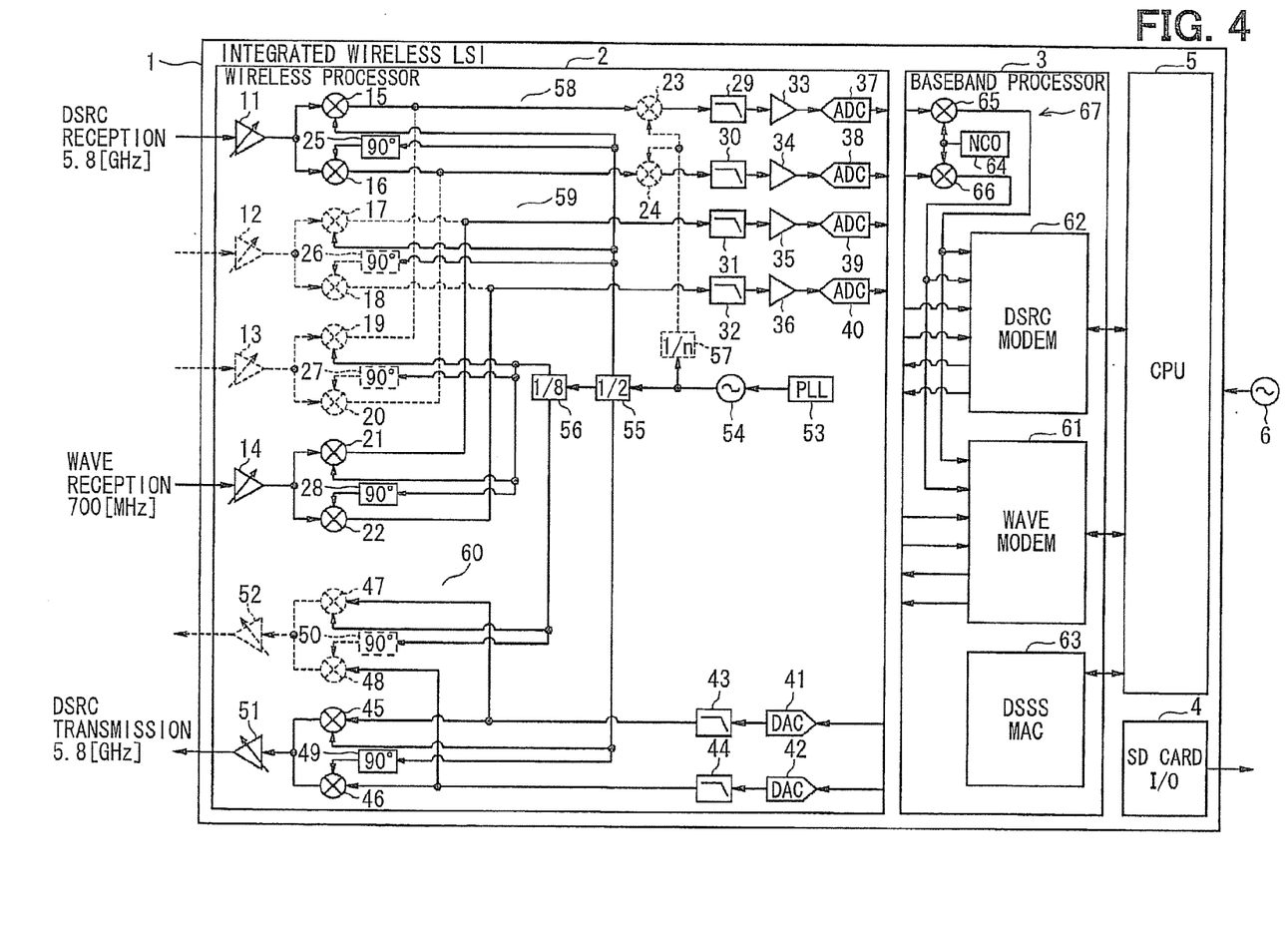
FIG. 4 is a diagram showing functional blocks which are active when a radio signal in a 5.8 GHz band of a DSRC system in a second region is transmitted in the second-region operation mode.

When the radio signal in the 5.8 GHz band of the DSRC system in transmitted, as shown in FIG. 4, the CPU 5 temporarily deactivates the functional block in which the radio signal is received at the second reception amplifier 12 and the functional block in which the radio signal is received at the third reception amplifier 13, which are included in the functional blocks in the reception block, and temporarily deactivates ninth reception mixer 23 and the tenth reception mixer 24. In addition, the CPU 5 temporarily deactivates the functional block in which the radio signal is transmitted from the second transmission amplifier 52. The functional block in which the radio signal is transmitted from the second transmission amplifier 52 includes the third transmission mixer 47, the fourth transmission mixer 48, the second transmission phase shifter 50, and the second transmission amplifier 52. Furthermore, the CPU 5 temporarily deactivates the 1/n divider 57 included in the functional block shared by the reception block and the transmission block. The CPU 5 activates the other functional blocks in the wireless processor 2 and the baseband processor 3. Also in FIG. 4, the functional blocks temporarily deactivated by the CPU 5 are shown by dashed lines and the functional blocks activated by the CPU 5 are shown by solid lines.

Figure 6:
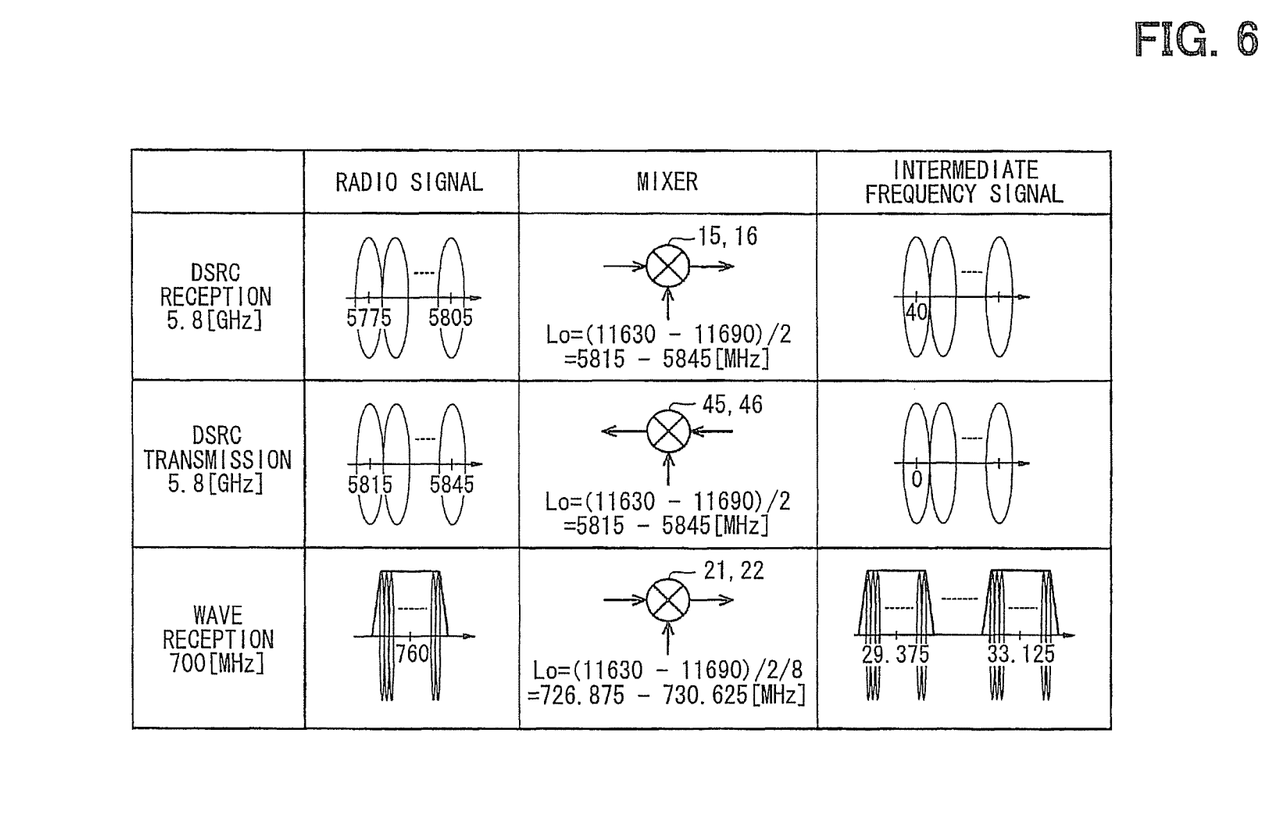
FIG. 6 is a diagram showing a frequency plan when a radio signal in the 5.8 GHz band of the DSRC system in the second region is transmitted.

FIG. 6 is a diagram showing a frequency plan when the radio signal in the 5.8 GHz band of the DSRC system in the second region is transmitted. The CPU 5 sets an oscillated frequency of the VCO of the PLL circuit 53 to be in a range from 11630 to 11690 MHz. Accordingly, local signals in a range from 726.875 to 730.625 (=(11630 to 11690)/2/8) MHz are transmitted to the seventh reception mixer 21 and the eighth reception mixer 22, which are included in the reception block of the 700 MHz of the WAVE system in the second region, local signals in a range from 5185 to 5845 (=(11630 to 11690)/2) MHz are transmitted to the first reception mixer 15 and the second reception mixer, which are included in the reception block of the 5.8 GHz band of the DSRC system in the second region, and local signals in a range from 5185 to 5845 MHz are transmitted to the first transmission mixer 45 and the second transmission mixer 46, which are included in the transmission block of the 5.8 GHz band of the DSRC system in the second region.

Because the intermediate frequency signals of the DSRC system in the second region transmitted from the first A/D converter 37 and the second A/D converter 38 in the wireless processor 2 are 0 MHz, the intermediate frequency signals are directly transmitted to the DSRC modem 62 in the baseband processor 3 and are demodulated. The intermediate frequency signals modulated by the DSRC modem 62 in the baseband processor 3 are transmitted to the first D/A converter 41 and the second D/A converter 42 in the wireless processor 2.

The intermediate frequency signals of the WAVE system in the second region transmitted from the third A/D converter 39 and the fourth A/D converter 40 in the wireless processor 2 are in a range from 29.375 to 33.125 MHz. After the intermediate frequency signals are treated with the frequency conversion section 67 to be 0 MHz, the intermediate frequency signals are demodulated by the WAVE modem 61. In other words, when the radio signal in the 5.8 GHz band of the DSRC system in the second region is transmitted, the oscillated frequency from the VCO of the PLL circuit 53 is selected to correspond to the 5.8 GHz band of the DSRC system in the second region. Thus, the intermediate frequency signal of the WAVE system in the second region is treated with frequency conversion by the frequency conversion section 67 to be 0 MHz.

The CPU 5 switches a period in which the radio signal in the 700 MHz band of the WAVE system in the second region is transmitted and a period in which the radio signal in the 5.8 GHz band of the DSRC system in the second region is transmitted as described below. In the period in which the radio signal in the 700 MHz band of the WAVE system in the second region is transmitted, the CPU 5 is in a second-region WAVE system transmission mode and activates the functional blocks as shown in FIG. 3. In the period in which the radio signal in the 5.8 GHz band in the second region is transmitted, the CPU 5 is in a second-region DSRC system transmission mode and activates the functional blocks as shown in FIG. 4. A process of switching the transmission mode performed by the CPU 5 will be described with reference to FIG. 7.

Figure 7:
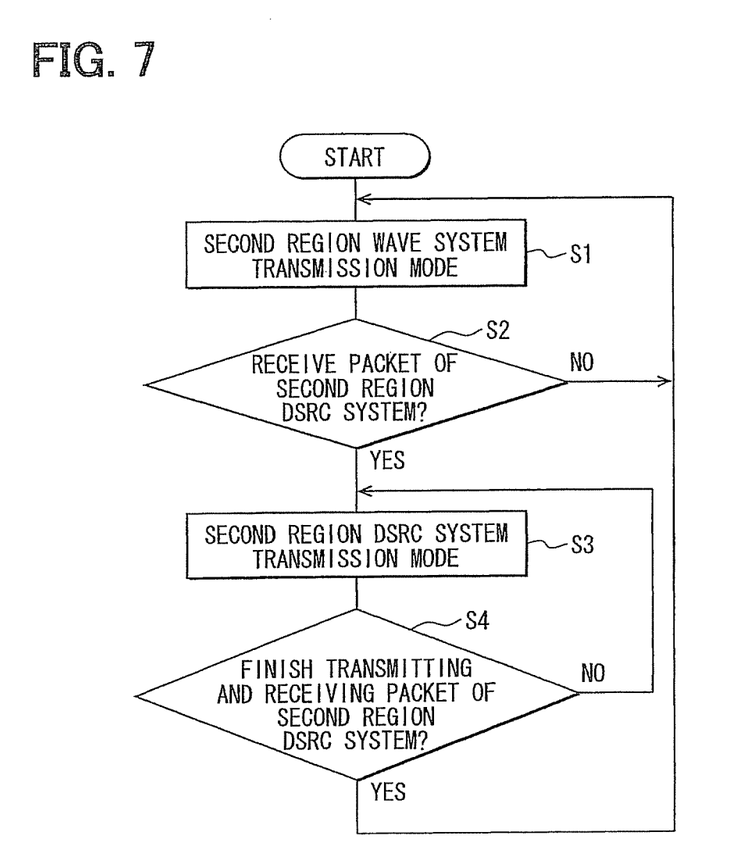
FIG. 7 is a flowchart showing a process performed by a central processing unit (CPU)

When electric power is applied to the wireless communication device and the CPU 5 is activated, at S1, the CPU 5 transitions to the second-region WAVE system transmission mode. At S2, while the CPU 5 operates in the second-region WAVE system transmission mode, the CPU 5 monitors whether the radio signal (packet) in the 5.8 GHz band of the DSRC system in the second region is received at S2.

When the CPU 5 determines that the radio signal in the 5.8 GHz band of the DSRC system in the second region is received, which corresponds to "YES" at S2, the process proceeds to S3. At S3, after the intermediate frequency signal corresponding to the wireless signal is demodulated, the CPU 5 transitions from the second-region WAVE system transmission mode to the second-region DSRC system transmission mode, and the CPU 5 operates in the second-region DSRC system transmission mode. At S4, while the CPU 5 operates in the second-region DSRC system transmission mode, the CPU 5 monitors whether a transmission and a reception of the radio signal in the 5.8 GHz band of the DSRC system in the second region is finished.

When the CPU 5 determines that the transmission and the reception of the radio signal in the 5.8 GHz band of the DSRC system in the second region is finished, which corresponds to "YES" at S4, the CPU 5 transitions from the second-region DSRC system transmission mode to the second-region WAVE system transmission mode and operates in the second-region WAVE system transmission mode at S1. The CPU 5 repeats the process from S1 to S4 while the CPU 5 is activated.

Figure 8:
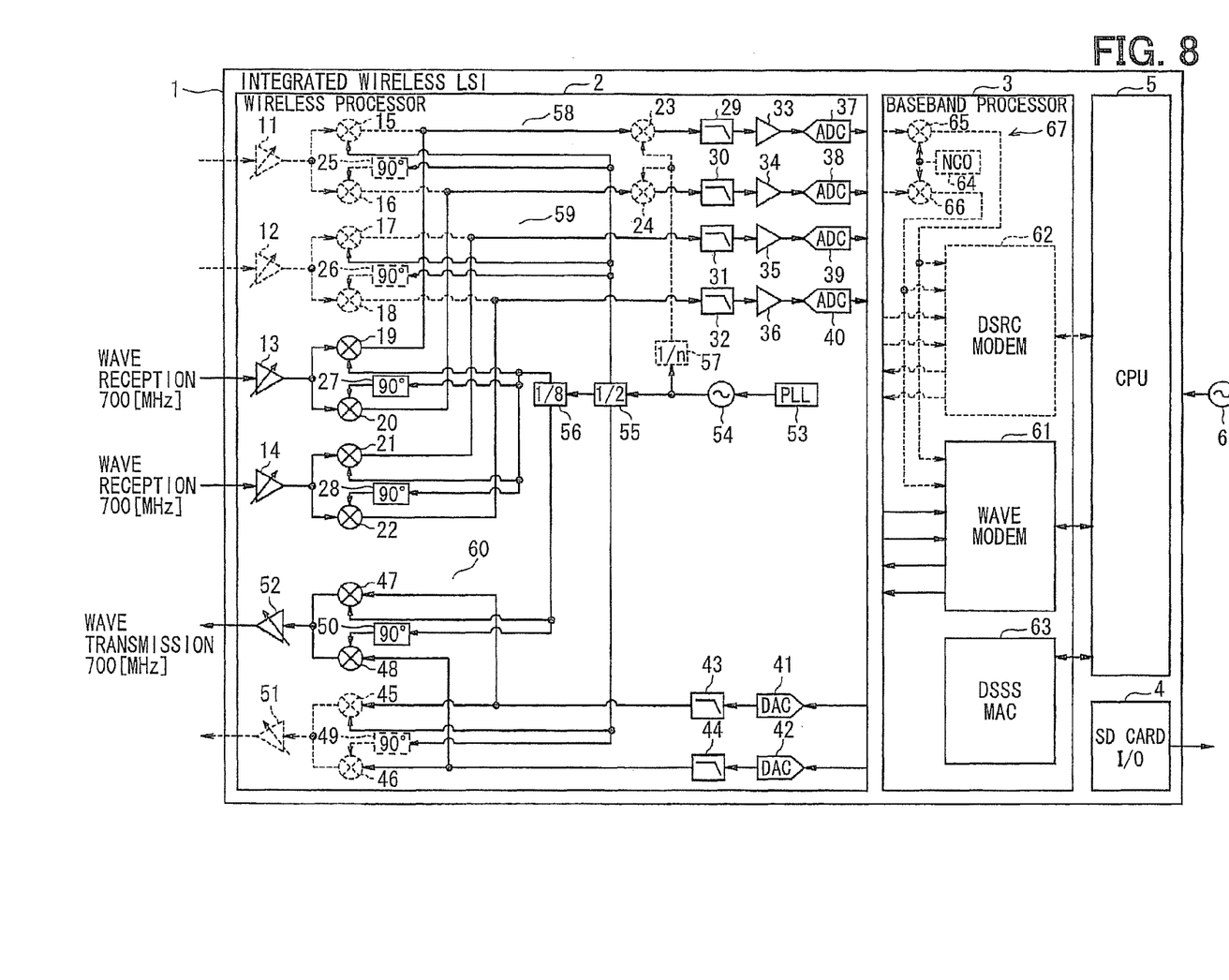
FIG. 8 is a diagram showing functional blocks which are active when a radio signal of the 700 MHz band in the WAVE system in the second region is received in a diversity scheme.

In the above-described example, in the case where the wireless communication device is used in the second region, the wireless communication device corresponds to both the WAVE system in the second region using the 700 MHz band and the DSRC system in the second region using the 5.8 GHz band. In a case where the wireless communication device has to correspond to the WAVE system in the second region using the 700 MHz and does not have to correspond to the DSRC system in the second region using the 5.8 GHz band, as shown in FIG. 8, the CPU 5 may temporarily deactivate the functional block in which the radio signal is received at the first reception amplifier 11, the functional block in which the radio signal is received at the second reception amplifier 12, the ninth reception mixer 23, the tenth reception mixer 24, the functional block in which the radio signal is transmitted from the first transmission amplifier 51, the 1/n divider 57, the DSRC modem 62, and the frequency conversion section 67 and may activate the other functional blocks in the wireless processor 2 and the baseband processor 3. Also in FIG. 8, the functional blocks temporarily deactivated by the CPU 5 are shown by dashed lines and the functional blocks activated by the CPU 5 are shown by solid lines. In this case, the CPU 5 temporarily deactivates the ninth reception mixer 23 and the tenth reception mixer 24 so that the first reception block 58 performs the one-stage frequency conversion. Accordingly, the first reception block 58 and the second reception block 59 have similar configurations, and the radio signal in the 700 MHz band of the WAVE system in the second region is received by the first reception block 58 and the second reception block 59 in the diversity scheme.

In the above-described embodiment, in the case where the wireless communication device corresponds to the WAVE system in the first region using the 5.9 GHz band, the radio signal of the WAVE system in the first region is received by the first reception block 58 and the second reception block 59 in the diversity scheme and the radio signal of the WAVE system in the first region is transmitted from the transmission block 60. In the case where the wireless communication device corresponds to the WAVE system in the second region using the 700 MHz band and the DSRC system in the second region using the 5.8 GHz band, the radio signal of the WAVE system in the second region is received by the second reception block 59, the radio signal of the DSRC system in the second region is received by the first reception block 58, and the radio signal of the WAVE system in the second region and the radio signal of DSRC system in the second region are transmitted from the transmission block 60 with time division switching. Accordingly, in either case where the wireless communication device is used in the first region or the second region, a redundant configuration can be reduced, and a cost of the wireless communication device can be reduced.

In the case where the wireless communication device is used in the second region, when the radio signal of the DSRC system is received in a state where the radio signal of the WAVE system in the second region is transmittable, after the intermediate frequency signal corresponding to the radio signal of the DSRC system in the second region is demodulated, the CPU 5 switches from the state where the radio signal of the WAVE system in the second region is transmittable to a state where the radio signal of the DSRC system in the second region is transmittable. Thus, the CPU 5 can promptly switch from the state where the radio signal of the WAVE system in the second region is transmittable to the state where the radio signal of the DSRC system in the second region is transmittable without requiring a period for establishing a clock synchronization in a period of switching the states. In other words, the wireless communication device is usually in the state where the radio signal of the WAVE system, which is the wide area, in the second region is transmittable, and only when the wireless communication device enters an area of the DSRC system, which is the narrow area, in the second region, the CPU 5 can promptly switch from the state where the radio signal of the WAVE system in the second region is transmittable to the state where the radio signal of the DSRC system in the second region is transmittable.

In addition, after the transmission and the reception of the radio signal of the DSRC system in the second region is finished in the state where the radio signal of the DSRC system in the second region is transmittable, the CPU 5 switches from the state where the radio signal of the DSRC system in the second region is transmittable to the state where the radio signal of the WAVE system in the second region is transmittable. Thus, when the wireless communication device exits from the area of the DSRC system, which is the narrow area, in the second region, the CPU 5 can promptly switch from the state where the radio signal of the DSRC system in the second region is transmittable to the state where the radio signal of the WAVE system in the second region is transmittable, and the wireless communication device can promptly return to the initial state where the radio signal of the WAVE system in the second region is transmittable.

Although the present invention has been fully described in connection with the above-described embodiments thereof with reference to the accompanying drawings, it is to be noted that various changes and modifications will become apparent to those skilled in the art. For example, the DSSS MAC 63 for assisting a safe driving may be omitted.

What is claimed is:

1. A wireless communication device comprising:
a wireless processor including a first reception block and a second reception block as reception blocks of receiving radio signals from a communication network and one transmission block as a transmission block of transmitting a radio signal to the communication network; and
a baseband processor including a first wireless communication system modem that processes an intermediate frequency signal of a first wireless communication system and a second wireless communication system modem that processes an intermediate frequency signal of a second wireless communication system,
wherein, in a first-region correspondence case in which the wireless communication device corresponds to a first-region wireless communication system used in a first region, the first reception block and the second reception block receive a radio signal of the first-region wireless communication system in a diversity scheme and the transmission block transmits a radio signal of the first-region wireless communication system,
wherein, in a second-region correspondence case in which the wireless communication device corresponds to a first second-region wireless communication system and a second second-region wireless communication system using different frequency bands and used in a second region different from the first region, the second reception block receives a radio signal of the first second-region wireless communication system, the first reception block receives a radio signal of the second second-region wireless communication system, and the transmission block transmits a radio signal of the first second-region wireless communication system and a radio signal of the second second-region wireless communication system with time division switching,
wherein the baseband processor includes a frequency conversion section that converts a frequency of an intermediate frequency signal,
wherein, in the first-region correspondence case, the first wireless communication system modem processes an intermediate frequency signal that is obtained by converting a frequency of the radio signal received by the first reception block and the second reception block in the diversity scheme,
wherein when the transmission block transmits the radio signal of the first second-region wireless communication system in the second-region correspondence case, the first wireless communication system modem processes an intermediate frequency signal that is obtained by converting a frequency of the radio signal received by the second reception block, and after the frequency conversion section converts a frequency of an intermediate frequency signal that is obtained by converting a frequency of the radio signal received by the first reception block, the second wireless communication system modem processes the intermediate frequency signal whose frequency is converted by the frequency conversion section, and wherein when the transmission block transmits the radio signal of the second second-region wireless communication system in the second-region correspondence case, the second wireless communication system modem processes an intermediate frequency signal that is obtained by converting a frequency of the radio signal received by the first reception block, and after the frequency conversion section converts a frequency of an intermediate frequency signal that is obtained by converting a frequency of the radio signal received by the second reception block, the first wireless communication system modem processes the intermediate frequency signal whose frequency is converted by the frequency conversion section.

2. The wireless communication device according to claim 1, wherein the wireless processor receives the radio signal of the second second-region wireless communication system in a state where the radio signal of the first second-region wireless communication system is transmittable, and after the intermediate frequency signal corresponding to the radio signal of the second second-region wireless communication system is demodulated, the wireless processor switches from the state where the radio signal of the first second-region wireless communication system is transmittable to a state where the radio signal of the second second-region wireless communication system is transmittable.

3. The wireless communication device according to claim 2, wherein after the wireless processor finishes transmitting and receiving the radio signals of the second second-region wireless communication system in the state where the radio signal of the second second-region wireless communication system is transmittable, the wireless processor switches from the state where the radio signal of the second second-region wireless communication system is transmittable to the state where the radio signal of the first second-region wireless communication system is transmittable.

4. The wireless communication device according to claim 1, wherein the wireless processor is configured so that, in the second-region correspondence case, the first reception block and the second reception block are capable of receiving the radio signal of the first second-region wireless communication system in a diversity scheme instead of receiving the radio signal of the second second-region wireless communication system by the first reception block.

5. The wireless communication device according to claim 1, wherein the first wireless communication system corresponds to a system applied to a vehicle-to-vehicle communication or a road-to-vehicle communication, and the second wireless communication system corresponds to a system applied to an electronic toll collection system.

* * * * *